Patented Aug. 19, 1947

2,425,840

UNITED STATES PATENT OFFICE 2,425,840

LOWER ALKYL MERCAPTANS AS SHORT-STOPPING AGENTS IN BUTADIENE-STYRENE EMULSION POLYMERIZATION

Walter A. Schulze and Willie W. Crouch, Bartlesville, Okla., assignors to Phillips Petroleum Company, a corporation of Delaware No Drawing. Application August 4, 1944, Serial No. 548,147

5 Claims. (Cl. 260—86.5)

1

This invention relates to the treatment of emulsion-polymerization systems with selected aliphatic mercaptans. More particularly the present invention relates to the treatment of emulsified butadiene-styrene and similar polymerizates with aliphatic mercaptans of relatively low molecular weight in order to retard further polymerization and to produce elastomers of improved plasticity, tack and color.

In the production of rubber-like materials from the copolymerization of butadiene with styrene, a predominance of linear polymers is preferred over the less desirable cross-link type. To realize this end, polymerization is ordinarily carried out until approximately 75 per cent of the monomer charge has been polymerized. A polymeric product thus prepared has been found to have improved characteristics relative to subsequent milling, extruding and shaping operations over polymers prepared as a result of greater total monomer conversion. However, exact control of the extent of polymerization is difficult since polymerization continues during the stripping operation employed to remove unreacted diene and styrene from the polymerizate. Control of this critical step in the manufacture of synthetic rubber has been effected through the addition of hydroquinone to the polymerization emulsion. While hydroquinone is effective in inhibiting further polymerization, the resulting polymer is badly discolored which is a disadvantage in the production of white or light colored products. Furthermore, the use of hydroquinone type inhibitors represents the employment of relatively costly chemicals which impart no favorable properties to the resultant polymer.

It is an object of the present invention to provide an improved additive for the retardation of emulsion polymerization as employed in the manufacture of synthetic rubber.

It is a further object of this invention to effectively retard polymerization and/or copolymerization in emulsion systems, as employed in the manufacture of synthetic rubber, by the addition of controlled amounts of selected aliphatic mercaptans at the end of the polymerization process.

An additional object is the production of synthetic rubber-like polymers and/or copolymers of improved color and working properties resulting from the employment of selected aliphatic mercaptans as agents to control the extent of polymerization.

The use of certain mercaptans in polymerization recipes involving conjugated diolefins and selected comonomers is well known. The said mercaptans are employed to modify the properties of the final products and are included as an integral part of the initial reaction charge. Such mercaptans are ordinarily aliphatic compounds of relatively high molecular weight and have been found to accelerate the rate of polymerization as well as to modify the properties of the product.

Our invention involves, in the emulsion polymerization of butadiene and an unsaturated comonomer, carrying the polymerization to the desired extent, and then arresting the polymerization by adding to the emulsion an aliphatic mercaptan of 1 to 5 carbon atoms per molecule, especially and preferably tertiary butyl mercaptan or tertiary amyl mercaptan.

We have discovered that aliphatic mercaptans of relatively low molecular weight when added to a butadiene emulsion polymerization system, effectively retard the polymerization subsequent to the time of addition and prevent any appreciable chain growth during subsequent process steps requisite to the removal of unreacted comonomer components. We have also found that these lower mercaptans, when added to the initial comonomer charge, are capable of preventing any appreciable degree of polymerization, and therefore are not to be confused with mercaptan modifiers which are added prior to polymerization. In addition to their function as polymerization retarders, the said aliphatic mercaptans have a beneficial softening effect on the polymeric product not hitherto reported for other polymerization short-stopping reagents.

The mercaptans of this invention are not absolute polymerization inhibitors, but they do exert a marked retarding effect on a catalyzed system. However, since the prevention of undue polymerization is necessary only during the blowing-down and stripping operations, i. e. during the interim period between completion of polymerization and the addition of the permanent inhibitor, the effect is essentially the same as that of a true inhibitor.

The mode of application of the mercaptan inhibitors of this invention may be illustrated with polymerization systems of the Buna S type. The polymerization charge may comprise butadiene, styrene and a modifier emulsified in an aqueous solution containing suitable emulsifying agents and polymerization catalysts. The emulsion is continuously agitated during polymerization and the reaction temperature is ordinarily held at about 50° C. The progress of the polymerization is followed by frequent control tests for unreacted monomer content of the batch until approximately 75 per cent conversion of monomer to polymer has been realized. When a polymer of the desired characteristics has been obtained, the polymerization is substantially terminated by the addition of a selected aliphatic mercaptan of relatively low molecular weight such as tertiary butyl mercaptan, in a quantity equivalent to about 0.2 per cent of the original monomer charge. To insure prompt response to the inhibiting action of the mercaptan it is desirable to add the said mercaptan in the form of an aqueous emulsion. After thorough dispersion of the inhibitor, the reaction mixture is blown down to remove butadiene and the stabilized emulsion is then stripped with steam to recover unreacted styrene. The polymer is subsequently recovered from the emulsion by the addition of a suitable coagulating agent, dried and worked into finished products by conventional means.

Polymers prepared in accordance with the above general procedure have been found to be softer and to possess better milling and shaping characteristics than polymers prepared without the addition of the mercaptans of this invention. A further favorable effect of the employment of the present mercaptan inhibitors is manifested in the reduction of cross-linked polymers as indicated by the improved solubility of the polymeric products in benzene.

The emulsion is prepared and the emulsion polymerization is conducted in the conventional manner. The polymerization is carried to at least 50 per cent and more commonly to a point in the neighborhood of 70 to 80 per cent of completion as determined by the consumption of original monomers. Ordinarily it is not desirable to exceed the 80 per cent figure because the properties of the polymer are adversely affected and because the length of time required is unduly increased which correspondingly reduces the production from given polymerizing equipment. For example in a typical run, polymerization to 80% of completion required 13-15 hours whereas polymerization to 90% of completion (using the same recipe and polymerizing conditions) required 24-26 hours and the attainment of 95% of completion required 38-42 hours.

While there is no sharp line of demarkation between aliphatic mercaptans possessing inhibitor characteristics and those which are ineffective, we prefer to employ aliphatic mercaptan homologs having not more than 5 carbon atoms per molecule in order to insure prompt and effective inhibition of polymerization. In the saturated aliphatic series we have found the tertiary mercaptans as exemplified by tertiary butyl and tertiary amyl mercaptans to be especially effective as short-stopping agents. We have found, furthermore, that mercaptans containing unsaturated hydrocarbon radicals may be employed for this purpose as well as the saturated aliphatic homologs. For example, we may employ the alkenyl mercaptans of 1 to 5 carbon atoms per molecule, such as 1-mercapto-2-butene.

The addition of the mercaptan inhibitors of this invention to the polymerization mixture may be accomplished in several ways. A convenient and effective manner of addition involves the preparation of an aqueous emulsion of the mercaptan, employing the same emulsifying agent as used in the main reactor charge. We have also found that aqueous solutions of alkali metal mercaptides as well as solutions of the free mercaptan in organic solvents are equally effective methods of metering precise quantities of inhibitor to the polymerization mixture.

The amount of mercaptan required to effect virtual cessation of polymerization will depend to a certain extent on the molecular weight and the structure of the mercaptan employed. In general, within the molecular weight range specified in this disclosure, the quantity of free mercaptan inhibitor may vary from 0.1 per cent to 5.0 per cent based on total monomer charge. The exact quantity of mercaptan necessary to retard the reaction and to produce a product of requisite softness, must be determined by experiment for each inhibitor and recipe. In the case of $C_4$ and $C_5$ mercaptans, when employed as shortstopping agents against Buna S recipes, concentrations of mercaptan in the range of 0.2 to 1.0 per cent of the total monomer charge are preferred.

The following specific examples are included to further illustrate the present invention; however, it is not intended that the invention be restricted to these exemplary operations. The parts are by weight.

*Example I*

In order to evaluate the effect of t-butyl mercaptan on emulsion polymerization systems and the products therefrom, three identical polymerization experiments were set up whereby t-butyl mercaptan could be compared with hydroquinone and with a control containing no added shortstopping reagent. The necessity of protection against polymerization during blowing-down and stripping operations and the protection afforded by added reagents were demonstrated by agitating the three systems for 15 hours at room temperature after a standard polymerization period. This additional period serves as an adequate measure of process periods in synthetic rubber manufacture when deleterious polymerization reactions may occur.

The charge to all three polymerization systems consisted of 75 parts butadiene and 25 parts styrene as an emulsion in 180 parts soap solution. Potassium persulfate was employed as the catalyst and 0.35 part tertiary dodecyl mercaptan was incorporated into the emulsion to serve as a modifying agent. Polymerization in the three systems was effected at 40° C. for a period of exactly 18 hours. At the conclusion of the polymerization period, tertiary butyl mercaptan was added to one system, hydroquinone was added to another while the remaining system received no additive of any kind. The tertiary butyl mercaptan was added to the polymerizate as a 4 per cent emulsion in 5 per cent aqueous sodium oleate while the hydroquinone was added as a 2 per cent solution in water. The three polymerization systems were then agitated for an additional 15 hours at room temperature, the polymers were recovered by coagulation, dried, weighed and examined as to physical characteristics. The experimental data and results are summarized in the following tabulation:

| System identified by additive | t-Butyl Mercaptan | Hydroquinone | No Additive |
|---|---|---|---|
| Polym. period prior to additive, Hrs. | 18 | 18 | 18. |
| Polym. temperature, ° C. | 40 | 40 | 40. |
| Period subsequent to additive, Hrs. | 15 | 15 | 15. |
| Temperature subsequent to additive, ° C. | 25 | 25 | 25. |
| Quantity of additive, per cent of original monomer. | 0.2 | 0.1 | 0. |
| Polymer yield, per cent of original monomer. | 63.7 | 61.9 | 69.6. |
| Color of polymer | White | Brown | White. |
| Characteristics of polymer | Soft and plastic. | Soft and plastic. | Hard. |

The above data reveal the utility of preventing over polymerization, in that the uninhibited system resulted in an inferior product. The products from the inhibited systems were substantially the same as far as physical characteristics were concerned with the exception of color. Thus it has been demonstrated that tertiary butyl mercaptan functions as a short-stopping agent with an efficiency comparable to that of hydroquinone with an added advantage in that no discoloration of the product takes place.

Example II

Two identical polymerization systems were set up to test the efficiency of 1-mercapto-2-butene as a short-stopping agent. The monomer composition, catalyst and mercaptan modifier were the same as used in Example I. Polymerization proper of the two systems was then carried out over a period of 18 hours under identical reaction conditions. One system was then treated with an emulsion of 1-mercapto-2-butene so as to incorporate a quantity of mercaptan into the polymerizate equal to 0.2 per cent of the weight of original monomer charge while the control system received no further treatment. Agitation of the two systems was then continued for an additional 6 hours prior to coagulation and recovery of the respective products. The results of the experiments are tabulated below:

Additive Used_____ 1-mercapto-2-butene_ None.
Polymer yield, per cent of 52.7_____ 62.7.
  monomer.
Polymer characteristics_____ soft and plastic_____ tough and hard.

The inhibiting action of unsaturated mercaptan is amply demonstrated by the above polymer yields. The formation of cross-linked polymers is also indicated by the characteristics of the untreated product.

Example III

The short-stopping efficiency of tertiary butyl mercaptan and its effect on the characteristics of the polymer product were determined in the following manner. Two polymerization systems were set up employing the charge recipe of Example I and polymerization was carried out simultaneously at 40° C. over a period of 24 hours. The polymer from the control system was coagulated, dried and weighed. However, to the second system tertiary butyl mercaptan was added in amount equivalent to 2.0 per cent of the weight of the monomer charge and agitation of the emulsion system was continued for an additional 24 hours at 40° C. The product from the inhibited system was worked up in the usual manner.

| Polymerization system | I | II |
|---|---|---|
| Polymerization proper: | | |
| Time, Hours | 24 | 24 |
| Temp., ° C | 40 | 40 |
| Short-stop agent added at end of 24 hours | t-BuSH | None |
| Reaction time of inhibited system, Hrs | 24 | |
| Total reaction time, Hrs | 48 | 24 |
| Polymer yield, per cent of monomer | 69.3 | 74.7 |
| Polymer solubility in benzene, per cent: | | |
| After 10 days storage | 100 | 91 |
| After 25 days storage | 99 | 85 |

The inhibiting action of the tertiary butyl mercaptan is demonstrated by a polymer yield somewhat lower than obtained in the control despite the fact that the treated system was subjected to polymerizing conditions for an additional 24 hours. Virtually no cross-linking of polymers in the treated sample has occurred after 25 days storage as is indicated by benzene solubility tests while the untreated product shows evidence of considerable deterioration of this type.

Example IV

The following experiments were carried out to determine the applicability of sodium mercaptides as polymerization short-stopping agents. The polymerization recipe employed in this work was the same as that of Example I. An aqueous solution of the sodium mercaptide was added to one system at the end of the regular polymerization period so as to provide the equivalent of 0.2 per cent t-butyl mercaptan based on the original monomer charge. Two untreated control polymerizations were carried out simultaneously under identical reaction conditions. The experimental data are presented in the following table:

| Polymerization system | I | II | III |
|---|---|---|---|
| Polymerization proper: | | | |
| Time, hours | 24 | 24 | 24 |
| Temp., ° C | 40 | 40 | 40 |
| Short-stop agent added at end of 24 hours | Na S-t-Bu | None | None |
| Additional reaction time, hours | 24 | 24 | |
| Total reaction time, hours | 48 | 48 | 24 |
| Polymer yield, per cent of monomer | 82.7 | 91.5 | 66.3 |
| Polymer solubility in benzene, per cent: | | | |
| After 10 days storage | 82 | 34 | 82 |
| After 25 days storage | 58.8 | 25.9 | 45.5 |

The above data would indicate that immediate cessation of polymerization did not occur on addition of the mercaptide solution; however, the effective retardation of reaction is indicated when the yields of the 24 hour and 48 hour controls are considered. The value of mercaptides in the prevention of formation of cross-linked polymers is especially evident from the benzene solubility of the respective storage samples. The treated systems gave a more satisfactory product than did system III which is representative of conventional operational methods.

We claim:

1. In a process for preparing synthetic rubbery copolymers of 1,3-butadiene with styrene by copolymerization of the monomers in an aqueous emulsion in the presence of an oxidizing polymerization catalyst for a period of time sufficient to effect conversion of 50 to 80 per cent of the monomers to copolymers, the step which comprises adding from 0.1 to 5.0 per cent by weight based on the monomer content of the original charge of a compound selected from the group consisting of the alkyl mercaptans containing not more than five carbon atoms per molecule and the corresponding alkali metal mercaptides to the emulsion at the end of the polymerization period whereby additional polymerization of the monomers and cross-linking of polymer molecules are substantially prevented and a stabilized copolymer white in color and possessing improved working properties is obtained.

2. In a process for preparing synthetic rubbery copolymers of 1,3-butadiene with styrene by copolymerization of the monomers in an aqueous emulsion in the presence of an oxidizing polymerization catalyst for a period of time sufficient to effect conversion of 50 to 80 per cent of the monomers to copolymers, the step which comprises adding from 0.1 to 5.0 per cent by weight based on the monomer content of the original charge of an alkyl mercaptan containing not more than five carbon atoms per molecule to the emulsion at the end of the polymerization period whereby additional polymerization of the monomers and cross-linking of polymer molecules are substantially prevented and a stabilized copolymer white in color and possessing improved working properties is obtained.

3. In a process for preparing synthetic rubbery copolymers of 1,3-butadiene with styrene by copolymerization of the monomers in an aqueous emulsion in the presence of an oxidizing polymerization catalyst for a period of time sufficient to effect conversion of 50 to 80 per cent of the monomers to copolymer, the step which comprises adding from 0.1 to 5.0 per cent by weight based on the monomer content of the original charge of an alkali metal mercaptide containing not more than five carbon atoms per molecule to the emulsion at the end of the polymerization period whereby additional polymerization of the monomers and cross-linking of polymer molecules are substantially prevented and a stabilized copolymer white in color and possessing improved working properties is obtained.

4. In a process for preparing synthetic rubbery copolymers of 1,3-butadiene with styrene by copolymerization of the monomers in an aqueous emulsion in the presence of an oxidizing catalyst for a period of time sufficient to effect conversion of 50 to 80 per cent of the monomers to copolymer, the step which comprises adding from 0.1 to 5.0 per cent by weight based on the monomer content of the original charge of a tertiary alkyl mercaptan containing not more than five carbon atoms per molecule to the emulsion at the end of the polymerization period whereby additional polymerization of the monomers and cross-linking of the polymer molecules are substantially prevented and a stabilized copolymer white in color and possessing improved working properties is obtained.

5. In a process for preparing synthetic rubbery copolymers of 1,3-butadiene with styrene by copolymerization of the monomers in an aqueous emulsion in the presence of an oxidizing catalyst for a period of time sufficient to effect conversion of 70 to 80 per cent of the monomers to copolymer, the step which comprises adding from 0.2 to 1.0 per cent by weight based on the monomer content of the original charge of a tertiary butyl mercaptan to the emulsion at the end of the polymerization period whereby additional polymerization of the monomers and cross-linking of the polymer molecules are substantially prevented and a stabilized copolymer white in color and possessing improved working properties is obtained.

WALTER A. SCHULZE.
WILLIE W. CROUCH.

REFERENCES CITED

The following references are of record in the file of this patent:

UNITED STATES PATENTS

| Number | Name | Date |
|---|---|---|
| 2,281,613 | Wollthan | May 5, 1942 |
| 2,234,204 | Starkweather | Mar. 11, 1941 |
| 2,316,949 | Garvey | Apr. 20, 1943 |

FOREIGN PATENTS

| Number | Country | Date |
|---|---|---|
| 364,089 | Great Britain | Dec. 21, 1931 |

OTHER REFERENCES

Mueller, India Rubber World (Oct. 1942), pp. 33–35 and 41.